(12) United States Patent
Balzano

(10) Patent No.: US 6,232,552 B1
(45) Date of Patent: May 15, 2001

(54) REPLACEMENT AND ADJUSTABLE WIRE HOLDER BLOCK AND CLIP

(76) Inventor: Alfiero Balzano, 11371 Monarch St., Garden Grove, CA (US) 92841

( * ) Notice: Subject to any disclaimer, the term of this patent is extended or adjusted under 35 U.S.C. 154(b) by 0 days.

(21) Appl. No.: 09/217,239

(22) Filed: Dec. 21, 1998

Related U.S. Application Data

(60) Provisional application No. 60/066,857, filed on Nov. 26, 1997.

(51) Int. Cl.[7] ........................................... H01R 13/46
(52) U.S. Cl. ...................... 174/60; 174/40 CC; 174/72 A; 174/138 G
(58) Field of Search ............................... 174/135, 138 G, 174/60, 72 A, 40 CC

(56) References Cited

U.S. PATENT DOCUMENTS

| | | | |
|---|---|---|---|
| 4,136,257 | * | 1/1979 | Taylor ................................. 174/68 |
| 5,302,137 | * | 4/1994 | Suffi .................................... 439/403 |
| 5,821,469 | * | 10/1998 | Shanmugham ....................... 174/135 |
| 5,952,616 | * | 9/1999 | Morrow ............................... 174/135 |

* cited by examiner

Primary Examiner—Dean A. Reichard
Assistant Examiner—Charlie Nguyen
(74) Attorney, Agent, or Firm—Roger A. Marrs

(57) ABSTRACT

A holding block for wires having a plurality of grooves in a surface for receiving a plurality of wires in spaced-apart relationship including a plurality of sets of openings in the block straddling each wire in the plurality so that a retaining clip can be introduced into each of the respective sets of openings for retaining the wire in position. Each clip includes a pair of barbed legs inserted into the respective sets of openings so as to mate with and engage with notches or points along the length of openings. The clip employs a pressure-bearing member midway between the barbed legs for forcible engagement with the insulated portion of each wire so as to hold the wire in position on the block. Staggering of the clips between adjacent wires places the plurality of wires and clips close together.

2 Claims, 1 Drawing Sheet

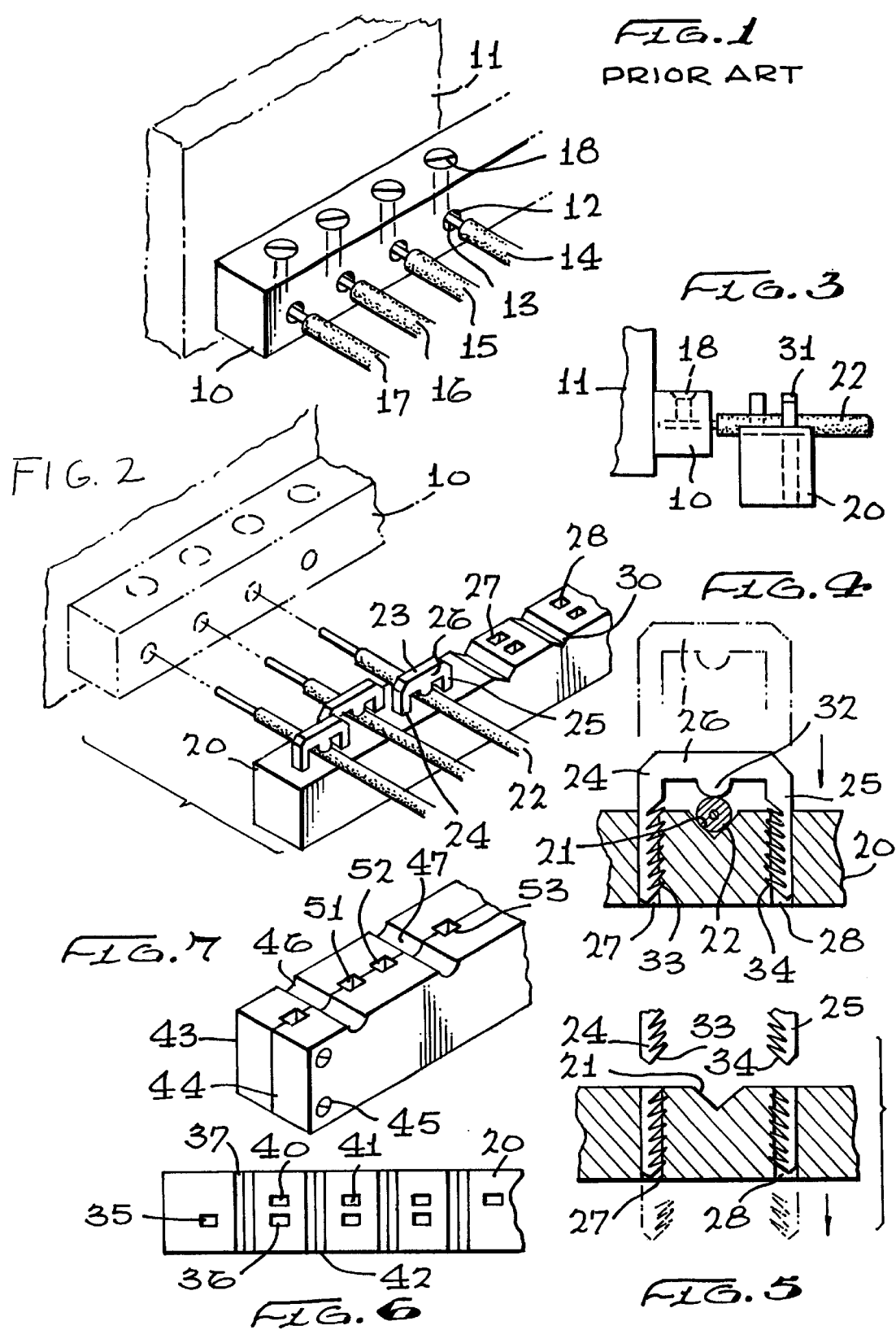

REPLACEMENT AND ADJUSTABLE WIRE HOLDER BLOCK AND CLIP

Priority based on Ser. No. 60/066,857 filed Nov. 26, 1997.

BACKGROUND OF THE INVENTION

1. Field of the Invention

The present invention relates to the field of terminal blocks, and more particularly to a novel block and clip arrangement for releasably and adjustably supporting a plurality of wires in spaced-apart relationship wherein the clip includes a barbed arrangement engageable with matable barbed grooves in a receiving aperture whereby individual and a plurality of wires may be held in spaced-apart relationship.

2. Brief Description of the Prior Art

In the past, it has been the conventional practice to bare the ends of wires so as to be free of insulation and to insert the bare portion of the wire into a receiving connector block. During the course of usage of the equipment, the requirement exists for circuit change which may include wire changes and replacement. Due to space requirements, it is difficult to disconnect or uncouple individual wires as well as a plurality of wires in order to accommodate the change or replacement since there is no means for holding the wires during substitution or change. During the replacement of removed wires, the conventional practice is to individually align and locate each wire serving as a replacement so that it may be connected or attached to the connection block.

Difficulties and problems have been encountered when using such conventional procedure which stem from the fact that the service may easily misalign replacement wires with receptacles intended to receive the bared portion of the wire causing circuit malfunction and damage. Also, service personnel have difficulty in properly aligning the bare tip of a wire into a slotted or aperture location so that the connection device can be actuated to hold the wire in place. Difficulties also occur when a plurality of such wires are intended to be replaced since current practice is to replace one wire at a time. Such a procedure is time-consuming and very labor intensive.

Therefore, a long-standing need has existed to provide a temporary holding lock for a plurality of wires so that the wires can be introduced to a connection block simultaneously followed by retaining or connecting the bare portion of the wire to the connection block. Such means should provide for simultaneous introduction or alignment of a plurality of bare-tipped wires to the receptacles in the connection block and should provide for easy and ready removal of an alignment device after the alignment has been completed.

SUMMARY OF THE INVENTION

Accordingly, the above problems and difficulties are avoided by the present invention which provides a novel holding block having a plurality of grooves in a particular surface for receiving a plurality of wires in spaced-apart relationship. The block further includes a plurality of sets of openings spanning or straddling each wire in the plurality so that a retaining clip can be introduced into each of the respective sets of openings for retaining the wire in position. Each clip includes a pair of barbed legs adapted to be inserted into the respective sets of openings so as to mate with and engage with notches or engagement points along the openings to receive the barbs from the clip. The clip also employs a pressure-bearing member midway between the barbed legs for forcible engagement with the insulated portion of each wire so as to hold the wire in position on the block. A feature of the invention also includes the staggering of the clips between adjacent wires so that the plurality of wires and clips can be placed close together.

Therefore, a primary object of the present invention is to provide an adjustable means for moving a plurality of wires in fixed position with respect to one another so as to permit readily installing the bare ends of the wire into openings in a terminal block for connection with an electrical circuit.

Another object of the present invention is to provide a novel alignment block for a plurality of wires that may be used during the removal and replacement of existing wires in a terminal block.

Yet another object is to provide a wire replacement and alignment device which will adjustably retain a plurality of wires and which will hold the wires in fixed spaced-apart relationship during the replacement procedure.

A further object resides in the easy changeability of wires in a terminal block without displacement of the wires during the installation procedure or interference with other wires in the terminal block.

A further object resides in employing a replacement and adjustable alignment wire holder including a block and clips for maintaining multiple wires in position with respect to one another during a replacement procedure with respect to an existing terminal block.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view showing a conventional terminal block having multiple wire leads intended to be replaced connected in accordance with current procedures;

FIG. 2 is an exploded perspective view showing the novel wire holder block and clips incorporating the present invention;

FIG. 3 is a side elevational view of the novel wire holder block and clips;

FIG. 4 is a sectional view, greatly enlarged, of the wire holder block and illustrating a clip in position for retaining a wire;

FIG. 5 is similar to the view of FIG. 4 illustrating a clip preparatory for insertion into openings or apertures of the block;

FIG. 6 is a fragmentary top plan view of the block illustrating a staggered relationship for the openings in order to accommodate multiple wires in close proximity; and FIG. 7 is a fragmentary perspective view of the block illustrating another version in accordance with the present invention.

DESCRIPTION OF THE PREFERRED EMBODIMENT

Referring to FIG. 1, a conventional terminal block is illustrated by numeral 10 which is illustrated as being mounted on electrical equipment indicated by numeral 11.

The conventional terminal block includes a plurality of openings, such as opening 12, into which the bare wire tip 13 of an electrical lead is inserted. Generally, the opening 12 will accommodate a portion of the insulated lead and such is indicated by numeral 14. A plurality of electrical leads are illustrated in parallel spaced-apart relationship by numerals 15, 16 and 17. Once the bare leads or portions of the leads 13 are inserted and seated within their respective openings 12, a clamp, such as a screw 18, may be turned to engage the wire and fixedly hold the wire in position. Additional electrical circuits from the equipment 11 are connected by bus wire or other electronic components to the terminals established by the clamps 18 and the bare portion 13 of the wire lead.

Problems have been encountered when attempting to replace any of the wire leads which stem largely from the fact that alignment of replacement wires must be achieved and usually, one wire at a time is replaced. Therefore, the present invention relates to an alignment device and one which will hold multiple leads for replacement in a simultaneous manner.

Referring now in detail to FIGS. 2 and 3, a novel wire holding device is illustrated which includes a holding block 20 having a plurality of transverse or laterally disposed grooves, such as V-shaped groove 21 into which a wire is placed. In the FIG. 2 illustration, a lead wire 22 is illustrated as being placed into a groove similar to the groove 21 but in spacedapart relationship therewith. In order to hold the lead wire or the multiple lead wires in position, a clip 23 is employed for each lead wire. Each clip 23 is of U-shaped configuration having a pair of downwardly extending legs 24 and 25 which are connected together by a crossmember 26. The holding block 20 includes a plurality of sets of elongated openings, such as identified by numerals 27 and 28, that straddle a groove 30. The legs of each clip are insertably received from the top surface of the block 20 into the respective openings 27 and 28 associated with each of the grooves holding a lead wire.

In FIG. 3, an end view is shown wherein the lead wire 22 is held by the holding block 20 via a clip 31 with the bare portion of the lead wire inserted into the terminal block 10 and held in position by the screw clamp 18.

Referring now in detail to FIG. 4, it can be seen that the clip 23 is illustrated in broken lines preparatory for engagement with the holder block 20. When the legs 24 and 25 are aligned with respective openings 27 and 28 straddling the lead wire 22, the crossmember 26 is directed towards the lead wire so that a pressure nub 32 bears against the insulation of the lead wire. Also, it can be seen that the opposing surfaces of the legs 24 and 25 are provided with a plurality of barbs, such as end barb 33 carried on leg 24 and end barb 34 carried on the end of leg 25. The barbs align with and mate with respective notches in the openings 27 and 28 so that the clip 23 will be retained on the holding block 20. The barbs are particularly oriented to permit insertion of the barbed legs into the openings in the direction of the arrow whereas withdrawal of the clip is resisted by the angular displacement of the barbs with respect to the notches in the holding block 20.

FIG. 5 more clearly illustrates the angular displacement of the barbs and the angular displacement of the notches in the clip legs and the block holder 20 respectively.

Referring now to FIG. 6, it can be seen that the plurality or multiplicity of sets of openings are offset from one another, in plan view, so that the lead wires may be placed closer together. For example, openings 35 and 36 are associated with an end groove 37 whereas openings 40 and 41, which are offset from alignment with the set of openings 35 and 36, are associated with the adjacent groove 42. In this manner, one clip can be inserted into the openings 35 and 36 to hold a wire in groove 37 while a second clip can be introduced and inserted into the openings 40 and 41 for holding a wire in the groove 42.

Referring to FIG. 7, an alternate version is illustrated in which the holding block 20 is composed of components 43 and 44 which are joined together by fasteners, such as screw 45, in order to hold the components together. In this embodiment, the grooves are rounded and indicated by numerals 46 and 47 respectively. The openings are in alignment and are not offset, as illustrated in FIG. 6. The aligned openings for receiving the legs of the clips are indicated by numerals 50 and 51 associated with groove 46 and openings 52 and 53 associated with groove 47.

In view of the foregoing, it can be seen that the holding block 20 may hold a multiple number of wires in fixed spaced-apart relationship by the clips 23 so that the bare portion of each wire outwardly projects for insertion into the openings 12 of a conventional terminal block 10. The alignment and simultaneous introduction of the wires into the block 10 are made adjustable by permitting the length of lead wire to extend further from the holding block as desired. The lead wires are not damaged or mechanically interferred with by the clips since the pressure nub 32 engages with the insulated portion of the lead wire and the pressure is adjusted by how far the clip is manually pushed into the respective openings.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An adjustable insulated wire holding block and clip combination comprising:

a holding block;

a plurality of transverse grooves provided in spaced-apart, parallel relationship across the width of said block and along the length of said holding block;

a plurality of sets of open-ended openings in said holding block located on opposite sides of said grooves;

at least one clip having a pair of spaced-apart legs joined together by a cross-member whereby said legs, with a barb on each of said legs, are adapted for insertion into one of said sets of said openings with said cross-member spanning one of said grooves;

each opening having a given length which includes a plurality of spaced apart notches arranged in a series along said length of said opening;

said barbs engagable with selected ones of said notches when said legs are inserted into one set of said openings;

a pressure nub carried on said cross-member between said legs for forcible engagement with an insulated wire residing in said one groove;

said plurality of sets of openings are staggered between adjacent ones of said grooves whereby a plurality of insulated wires and clips are permitted to be placed close together;

one of said clips is of a U-shaped configuration in front elevational view;

said plurality of wires are disposed in parallel spaced-apart relationship in said grooves and a separate one of said clips straddles or spans each of said insulated wires.

2. The block and clip combination defined in claim 1 wherein:

said holding block having a work surface defined between parallel side edges;

said sets of openings are not only staggered on said block but are non-linear across the length of said work surface.

* * * * *